A. F. MASURY AND A. G. HERRESHOFF.
STEERING WHEEL.
APPLICATION FILED AUG. 5, 1919.
1,361,272. Patented Dec. 7, 1920.
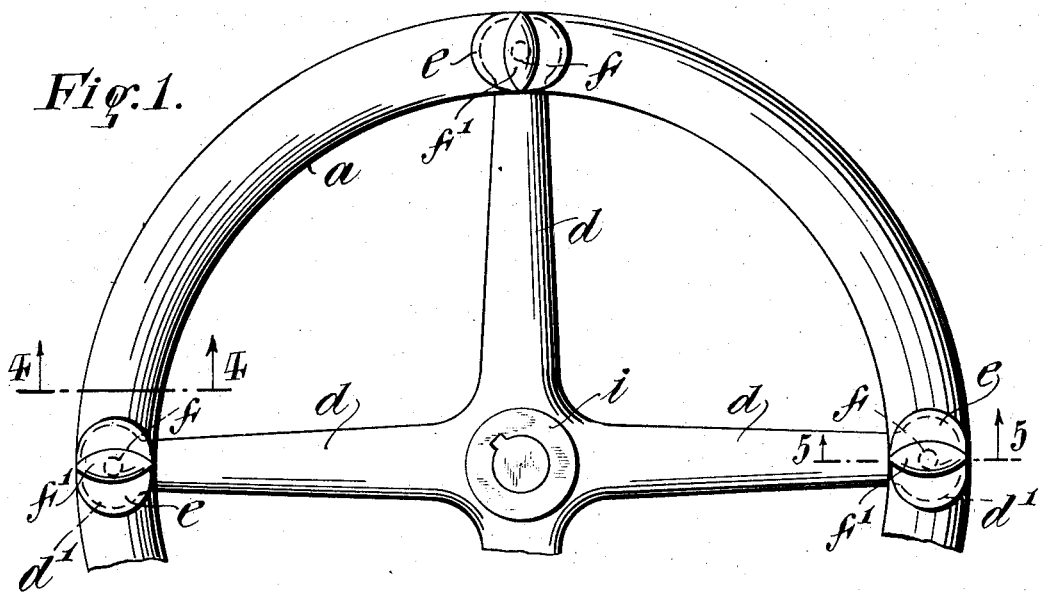
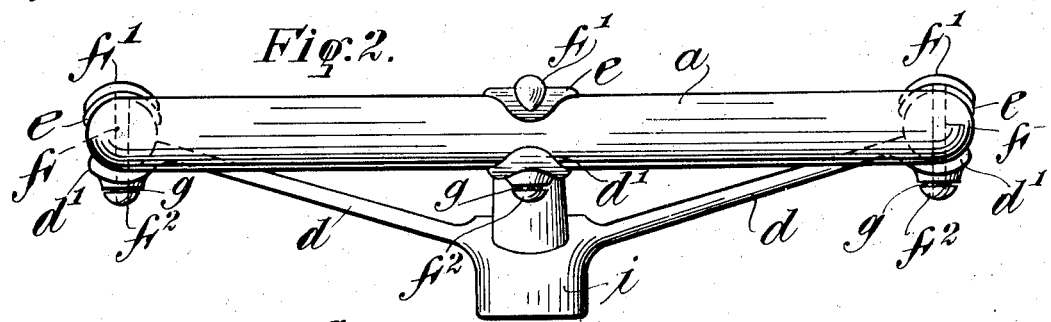
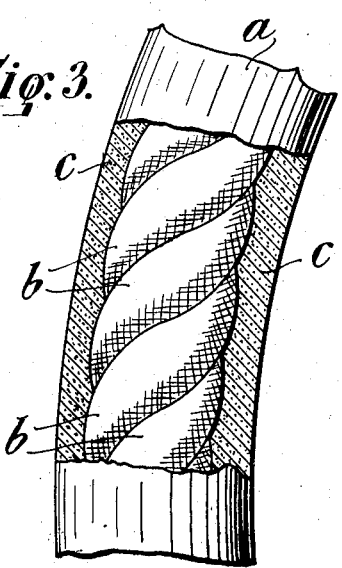
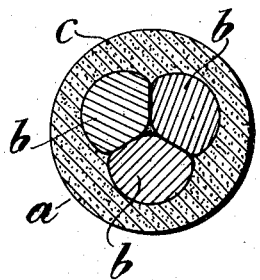
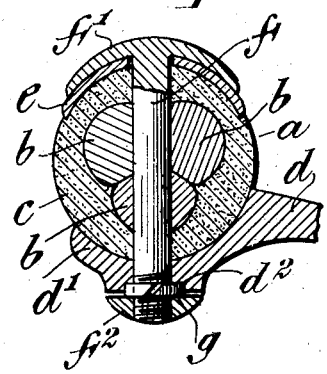
INVENTORS
BY
ATTORNEYS

UNITED STATES PATENT OFFICE.

ALFRED F. MASURY AND ALEXANDER GRISWOLD HERRESHOFF, OF NEW YORK, N. Y., ASSIGNORS TO INTERNATIONAL MOTOR COMPANY, OF NEW YORK, N. Y., A CORPORATION OF DELAWARE.

STEERING-WHEEL.

1,361,272.   Specification of Letters Patent.   Patented Dec. 7, 1920.

Application filed August 5, 1919. Serial No. 315,450.

*To all whom it may concern:*

Be it known that we, ALFRED F. MASURY and ALEXANDER GRISWOLD HERRESHOFF, citizens of the United States, and respectively residing in the borough of Manhattan and city and State of New York, have invented certain new and useful Improvements in Steering-Wheels, of which the following is a specification, reference being had to the accompanying drawings, forming a part hereof.

Steering wheels for motor vehicles are usually formed of an inflexible annulus carried on a spider of the steering post. Road shocks on the vehicle wheels are transmitted through the steering gear to the hands of the driver, the shocks incidental to the steering of a heavy motor truck being so substantial and continuous as to impose very tiring strains on the operator. The object of the present invention is to relieve the driver of such shocks by providing a flexible annulus of sufficient stiffness to insure the required accurate control in steering. A further feature of the invention is concerned with improved devices for clamping the annulus on the spider in such a way as to increase the flexibility of the construction.

In accordance with the preferred embodiment of the invention the annulus is formed of one or more strands of relatively stout fiber, such as Manila rope, embedded in a rubber sheathing. This annulus is clamped onto the spider by means of cup-shaped washers engaged by through bolts.

Reference is now to be had to the accompanying drawing for a detailed inscription of one embodiment of the invention in which:

Figure 1 is a plan view of a portion of a steering wheel constructed in accordance with the invention.

Fig. 2 is a view in side elevation of the wheel shown in Fig. 1.

Fig. 3 is a fragmentary detail view on a larger scale of the improved annulus, parts being broken away to show the relation of the center strand to the rubber sheathing.

Fig. 4 is a sectional view of the annulus taken on the plane indicated by the line 4—4 of Fig. 1 and looking in the direction of the arrows.

Fig. 5 is a sectional view through the annulus and spider taken on the plane indicated by the line 5—5 of Fig. 1 and looking in the direction of the arrows.

The improved annulus $a$ which is gripped by the driver when steering is intended to be of such flexibility as to relieve the hands of the strains which are ordinarily transmitted thereto from the road shocks on the vehicle wheels. It will be understood, however, that this annulus must have sufficient stiffness to enable accurate steering to be effected in the usual manner. The invention resides, broadly, in the provision of an annulus which has a core formed of fibrous material such as one or more strands of Manila rope or the like, embedded in a suitable sheathing, having some degree of resiliency combined with hardness. Anti-skid rubber is suitable for the purpose.

Referring now to the detail views, twisted strands $b$ of Manila rope are shown as embedded in rubber sheathing $c$, the latter being molded to form an annulus of suitable diameter. The ends of the strands may be secured by splicing.

Referring now to Figs. 1 and 2, it appears that the arms $d$ of the spider $i$ are cast at their ends with curved supports $d^1$ to receive the annulus $a$. The annulus $a$ is clamped in position on the spider by means of curved washers $e$, through which pass bolts $f$, having curved heads $f^1$, which rest in snug engagement with the washers $e$. The bolts $f$ extend through the annulus $a$ and have nuts $f^2$ threaded on their lower ends. Lock washers $g$ may be placed on the bolts $f$ and rest in recesses $d^2$ cast in the spider arms $d$. The curved washers $e$ conform in outline to the curvature of the annulus $a$, and when drawn into engagement with the annulus by the heads $f^1$ of the bolts $f$, serve to clamp the annulus onto the coöperating curved holders $d^1$. By reason of the resiliency of the annulus the clamps $e$ are pressed into the sheathing $c$, but the clamping action secured will permit the annulus to work somewhat underneath the clamps, thereby insuring the required degree of flexibility.

From the description given it will be appreciated that the resilient annulus acts as a shock absorbing element, and will be particularly effective in relieving the hands of the constant vibrations on the steering wheel. The invention is not limited to the use of a fibrous material since it is evident that flexibility and stiffness might be secured with a core of prepared fabric, such as canvas, or might be formed of a flexible wood, such as willow. The use of a stiff but somewhat flexible core in a resilient sheathing constitutes the essence of the invention.

We claim as our invention:

1. A steering annulus for steering wheels comprising a flexible core stiffened by twisting and a resilient sheathing.

2. A steering annulus for steering wheels comprising a core of rope stiffened by twisting and a sheathing of rubber molded directly thereon.

3. A steering wheel comprising a spider having arms formed with curved seats, an annulus of flexible material stiffened by twisting supported on the seats, curved clamps on the upper periphery of the annulus and means to secure the clamps.

4. A steering wheel comprising a spider having arms formed with curved seats, an annulus of flexible material stiffened by twisting supported on the seats, curved clamps on the upper periphery of the annulus and through bolts passing through the clamps and the annulus and having curved heads to engage the clamps.

5. The method of making non-metallic steering wheels which consists in twisting a non-metallic rope, and inclosing the twisted rope in a seamless tube of elastic material.

6. The method of making non-metallic steering wheels which consists in twisting a non-metallic rope and inclosing the twisted rope in a seamless tube of elastic material having a smooth outer surface.

7. The method of making non-metallic steering wheels which consists in twisting rope, inclosing the twisted rope in an endless tube of elastic material, mounting the inclosed rope upon the arms extending from the spokes of the wheel and joining the arms with the inclosed rope by forcing bolts through the rope and its closure, and joining the arms with the bolts.

This specification signed this 4th day of August, A. D. 1919.

ALFRED F. MASURY.
ALEXANDER GRISWOLD HERRESHOFF.